Figure 1:
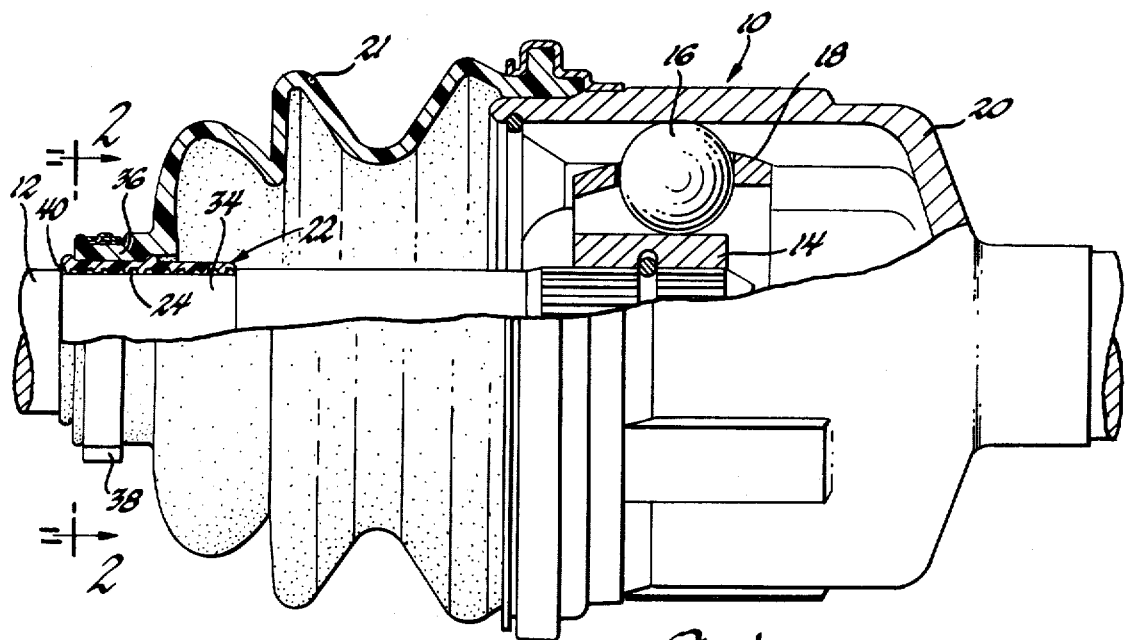

United States Patent [19]

Gehrke

[11] 4,224,808
[45] Sep. 30, 1980

[54] VENTING ARRANGEMENT FOR STROKING UNIVERSAL JOINT

[75] Inventor: Glenn F. Gehrke, Saginaw, Mich.

[73] Assignee: General Motors Corporation, Detroit, Mich.

[21] Appl. No.: 3,712

[22] Filed: Jan. 15, 1979

[51] Int. Cl.³ ............................................. F16D 3/02
[52] U.S. Cl. ........................................ 64/32 F; 64/3; 64/32 R; 277/208; 277/212 FB
[58] Field of Search ............... 64/21, 32 R, 32 F, 3; 277/208, 212 R, 212 FB, 89; 285/235

[56] References Cited

U.S. PATENT DOCUMENTS

| | | | |
|---|---|---|---|
| 1,922,431 | 8/1933 | Geyer | 64/32 F |
| 2,354,961 | 8/1944 | O'Donnell | 64/32 F X |
| 3,008,311 | 11/1961 | Mazziotti | 64/17 R |
| 3,362,193 | 1/1968 | Ritsama | 64/21 X |
| 3,928,985 | 12/1975 | Girguis | 64/21 |
| 3,942,336 | 3/1976 | Schultenkämper | 277/208 X |
| 4,079,599 | 3/1978 | Girguis | 64/21 |
| 4,083,202 | 4/1978 | Westercamp | 64/32 R |
| 4,167,860 | 9/1979 | Sakaguchi et al. | 64/21 |

Primary Examiner—Henry K. Artis
Attorney, Agent, or Firm—F. J. Fodale

[57] ABSTRACT

A venting arrangement for a stroking universal joint comprises a split vent sleeve seated in a closed position in a shallow annular groove of the drive shaft and maintained therein by a clamped neck portion of a flexible elastomeric boot. The vent sleeve has an internal spiral groove which provides a vent passage for accommodating interior volume changes of the universal joint during stroking. The longitudinal ends of the vent sleeve defining the split are castellated in a complementary manner to provide intermeshing tongues and grooves and a radial slot located in the interior of the universal joint for purging grease from the spiral groove during universal joint rotation.

3 Claims, 4 Drawing Figures

U.S. Patent   Sep. 30, 1980   4,224,808

VENTING ARRANGEMENT FOR STROKING UNIVERSAL JOINT

This invention relates generally to universal joints and more particularly to universal joints having stroking capabilities such as the universal joint disclosed in U.S. Pat. No. 4,083,202 granted Apr. 11, 1978 to Kenneth L. Westercamp for a "Stroking Universal Joint Housing".

Stroking universal joints are used, for instance, at the inboard ends of the front drive axles for front wheel drive cars. During operation, the universal joints stroke in and out to accommodate suspension movements of the front wheels with respect to the vehicle body. This stroking results in a changing volume of the space inside the universal joint which is usually sealed by a flexible elastomeric boot secured to the universal joint housing and the drive axle. The changing volume in turn produces air pressure differentials which increase the distortion of the flexible elastomeric boot during operation and affect its durability.

The object of this invention is to provide a venting arrangement which permits the stroking universal joint to take in or expel air as necessary to equalize the interior and exterior air pressure on the flexible elastomeric boot.

Another object of this invention is to provide a venting arrangement which prevents the escape of lubricant from the interior of the universal joint.

Yet another object of this invention is to provide a venting arrangement which resists the intake of water, dirt and other contaminants.

Yet another object of this invention is to provide a venting arrangement which has a self-purging feature.

Still yet another object of this invention is to provide a venting arrangement which is simple, inexpensive to manufacture and easily incorporated in an existing universal joint.

Figure 2:
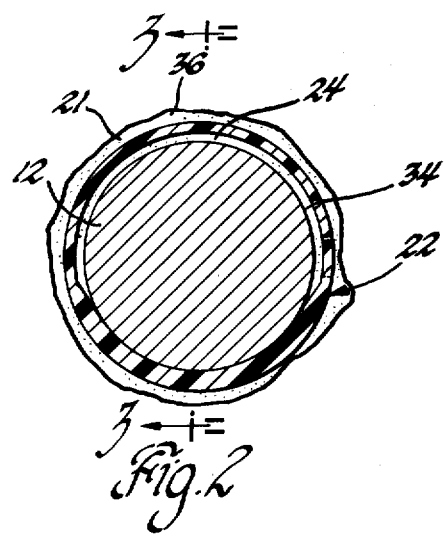
Figure 3:
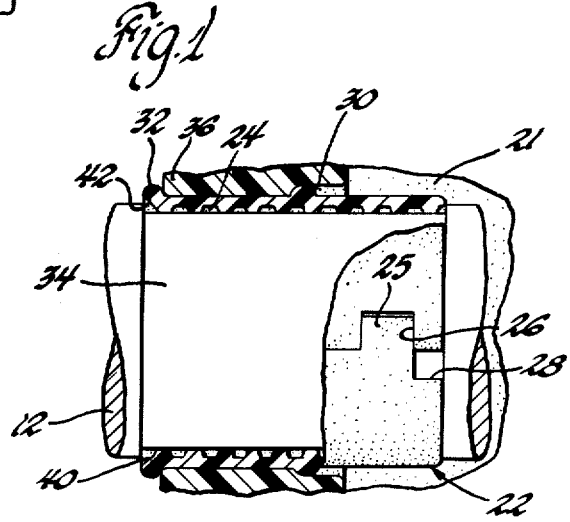
Figure 4:
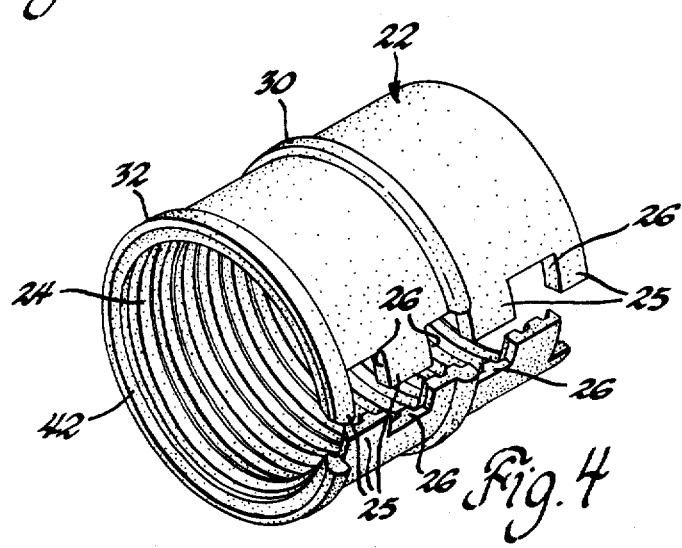

Other objects and features of the invention will become apparent to those skilled in the art as the disclosure is made in the following detailed description of a preferred embodiment of the invention as illustrated in the accompanying sheet of drawing in which:

FIG. 1 is an elevational, partially sectioned, view of a stroking universal joint having a venting arrangement in accordance with this invention, FIG. 2 is a section taken substantially along the line 2—2 of FIG. 1 looking in the direction of the arrows, FIG. 3 is a section taken substantially along the line 3—3 of FIG. 2 looking in the direction of the arrows, and FIG. 4 is a perspective view of a vent sleeve used in the venting arrangement shown in FIG. 1.

Referring now to the drawing and particularly to FIG. 1, the stroking universal joint 10 comprises a drive shaft 12, spline connected to an inner drive member 14, a plurality of drive balls 16, a cage 18, and an outer drive member 20 in the form of a bell-shaped housing. The drive balls 16 are disposed in radially paired longitudinal grooves in the inner drive member 14 and the outer drive member 20. The position of the drive balls 16 in the longitudinal grooves is controlled by the grooves themselves and the cage 18. The universal joint 10 operates in a well-known manner to provide constant velocity operation when rotated under angle and a stroking capability. Briefly, the cage 18 pivots on the inner drive member 14 and in the outer drive member 20 about centers equally offset from the universal joint center when the joint is bent at an angle to maintain the drive balls in the half-angle or constant velocity plane for constant velocity operation. The cage 18 is also slidable in the outer drive member 20 to permit stroking.

As customary for automotive applications, the universal joint 10 is sealed by a flexible elastomeric boot 21 secured to the outer drive member 20 and the drive shaft 12 and the interior space of the sealed universal joint is partially filled with grease or other suitable lubricant.

The venting arrangement comprises a vent sleeve 22 which has a longitudinal split and a trapezoidal profiled internal groove 24 which forms one continuous spiral from end to end when the longitudinal split is closed. As best shown in FIG. 4, the longitudinal ends of the vent sleeve 22 defining the split are castellated in a complementary manner to provide multiple tongues 25 and grooves 26. The tongues 25 and grooves 26 intermesh when the longitudinal split is closed to prevent relative motion of the longitudinal ends and effectively seal the longitudinal split. The mating tongue 25 and groove 26 at one end of the vent sleeve 22 (right end as viewed in the several figures) is dimensioned to provide a radial slot 28 when the longitudinal split is closed for purposes described below.

The vent sleeve 22 has an external circumferential bead 30 at a median location and another external circumferential bead 32 at the end opposite the end having the radial slot 28.

The vent sleeve 22 is molded from a low modulus plastic material, such as Delrin, and is molded having an open split as shown in FIG. 4. The vent sleeve 22 is assembled to the universal joint 10 by expanding the open split over the diameter of a shallow circumferential groove 34 in the drive shaft 12. The vent sleeve 22 is then compressed closing the split and seated in the shallow groove 34 which serves to locate the vent sleeve 22 axially. The neck 36 of the flexible elastomeric boot 21 is then slid over the compressed vent sleeve 22 and seated between the external circumferential beads 30 and 32 where it is tightly clamped by a flat ring clamp 38 of conventional design. The internal spiral groove 24 of the vent sleeve 22 is deeper than the shallow groove 34 in the drive shaft 12 so that the exterior end of the spiral groove 24 of the assembled vent sleeve 22 is exposed to the atmosphere at 40. In the assembled position, the radial slot 28 of the vent sleeve 22 is located in the interior of the universal joint 10. This radial slot 28 extends longitudinally so that at a minimum it intersects the first and second turns of sprial groove 24.

The contact of the inside diameter of the vent sleeve 22 with the bottom of the shallow groove 34 in the drive shaft 12 forms a sprial passageway winding around the shaft. This spiral passageway, whose length is controlled by the pitch of the internal spiral groove 24 and the length of the vent sleeve 22, allows air to flow in and out of the universal joint interior as necessary to equalize the interior and exterior air pressure on the flexible elastomeric boot 21 during stroking.

During operation the drive shaft 12, vent sleeve 22 and neck portion 36 of the flexible elastomeric boot 21 rotate about the axis of the drive shaft 12. Lubricant in the universal joint interior in the vicinity of the neck portion 36 propagates outwardly under the influence of centrifugal force. This tends to leave the interior end portion of the vent sleeve 22 clear from most of the grease in the universal joint 10.

Some grease may however be forced into the first turn of the spiral groove 24 at the interior end of the vent sleeve 22 due to a large stroking movement from abnormal suspension travel or during assembly or repair. The radial slot 28 at the interior end of the vent sleeve 22 provides a self purging feature for such a condition. Grease initially in the radial slot 28 is evacuated after a short period of operation due to the centrifugal force. The radial slot 28 then provides a by-pass around the first turn of the spiral groove 24 plugged with grease which allows air to pass directly from the radial slot 28 into the second turn of the spiral groove 24.

In time, the grease in the first turn migrates around the drive shaft 12 to the radial slot 28 where it is flung outwardly by centrifugal force. This self purging continues until the first turn of the spiral groove 24 is again breathing freely.

The vent arrangement also resists the intake of contaminants, particularly water, and allows the universal joint 10 to operate in rain, slush, and snow without ingesting water. Three features of the vent sleeve 22 act as barriers against water entry.

The direction of the internal spiral groove 24 (clockwise or counterclockwise) is selected such that during joint rotation, the water must rotate faster than the drive shaft 12 to move into the spiral groove 24. Secondly, the external end of the vent sleeve 22 at the circumferential bend 32 has an internal chamfer 42 which tends to fling the water radially outward away from the internal spiral groove 24.

Finally there is the effective length of the internal spiral groove 24 itself. Conditions which subject the vent sleeve 22 to a great deal of water, such as deep puddles, usually are of short duration. Any action tending to force water into the internal spiral groove 24 during these conditions, normally ends before water traverses the entire effective length of the spiral groove 24 and enters the interior of the universal joint. Once the condition is over, any water in the internal spiral groove 24 evaporates.

The above venting arrangement equalizes the external and internal air pressure on the elastomeric boot 21 during stroking and increases its flex life because distortions due to pressure differentials are eliminated. At the same time grease is retained and water entry is effectively prevented.

In addition to the self purging feature, it should be noted the venting arrangement is extremely simple, inexpensive to manufacture and easily incorporated in an existing universal joint, requiring only a molded plastic vent sleeve, a shallow groove in the drive shaft and a slightly enlarged neck on the flexible elastomeric boot. I wish it to be understood that I do not desire to be limited to the exact details of construction shown and described, for obvious modifications will occur to a person skilled in the art.

The embodiments of the invention in which an exclusive property or privilege is claimed are defined as follows:

1. A venting arrangement for a stroking universal joint having an outer drive member, an inner drive member disposed in the outer drive member which is drivingly and strokingly connected thereto, a shaft connected to the inner drive member and a flexible elastomeric boot mounted on an end of the outer drive member and the shaft at opposite ends, comprising:

an annular groove in the periphery of the shaft, and a vent sleeve disposed in the annular groove and maintained therein by means including a neck portion of the flexible elastomeric boot, said vent sleeve having an internal spiral groove extending from end to end which provides a spiral vent passage for accommodating interior volume changes of the universal joint during stroking movement of the stroking universal joint, and said vent sleeve having a radial slot which is disposed in the interior of the universal joint for purging grease from the internal spiral groove during universal joint rotation.

2. A venting arrangement for a stroking universal joint having an outer drive member, an inner drive member disposed in the outer drive member which is drivingly and strokingly connected thereto, a shaft connected to the inner drive member, and a flexible elastomeric boot mounted on an end of the outer drive member and the shaft at opposite ends, comprising:

a shallow annular groove in the periphery of the shaft, and a longitudinally split vent sleeve seated in the annular groove in a closed position and maintained therein by means including a neck portion at one end of the flexible elastomeric boot, said vent sleeve having an internal spiral groove extending from end to end which is deeper than the shallow annular groove of the shaft and which provides a vent passage for accommodating interior volume changes of the universal joint during stroking movement of the stroking universal joint, and said vent sleeve having a radial slot which is disposed in the interior of the universal joint and which intersects at least two turns of the internal spiral groove at the interior end for purging grease from the spiral groove during universal joint rotation.

3. A venting arrangement for a stroking universal joint having an outer drive member, an inner drive member disposed in the outer drive member which is drivingly and strokingly connected thereto, a shaft connected to the inner drive member, and a flexible elastomeric boot mounted on an end of the outer drive member and the shaft at opposite ends, comprising:

an annular groove in the periphery of the shaft, and a split vent sleeve of molded plastic material seated in the annular groove in a closed position under radial compression and maintained therein by means including a neck portion at one end of the flexible elastomeric boot which engages an outer periphery of the closed vent sleeve, said vent sleeve having an internal spiral groove which provides a vent passage for accommodating interior volume changes of the universal joint during stroking movements, and said vent sleeve having longitudinal ends defining the longitudinal split which are castellated in a complementary manner to provide intermeshing tongues and grooves in the closed position and a radial slot at an end portion disposed in the interior of the joint for purging grease from an internal end portion of the spiral groove during universal joint rotation.

* * * * *